United States Patent [19]

Mathes et al.

[11] Patent Number: 4,976,578

[45] Date of Patent: Dec. 11, 1990

[54] FASTENING ELEMENT

[75] Inventors: Bernhard Mathes, Buettelborn; Guenter Gosing, Ruesselsheim; Martin Oberfrank, both of Ruesselsheim, all of Fed. Rep. of Germany

[73] Assignee: General Motors Corporation, Detroit, Mich.

[21] Appl. No.: 456,105

[22] Filed: Dec. 22, 1989

[30] Foreign Application Priority Data

Dec. 24, 1988 [DE] Fed. Rep. of Germany ....... 3843765

[51] Int. Cl.$^5$ ............................................. F16B 21/07
[52] U.S. Cl. ..................................... 411/512; 411/510; 411/913; 24/297; 24/682
[58] Field of Search ................... 411/508–510, 411/512, 913; 24/297, 618, 662, 681, 682, 697

[56] References Cited

U.S. PATENT DOCUMENTS

| 1,148,112 | 7/1915 | Mead | 24/662 X |
|---|---|---|---|
| 2,612,139 | 9/1952 | Collins | 24/681 X |
| 2,854,266 | 9/1958 | Dies | 24/681 X |
| 3,126,038 | 3/1964 | Jaworski | 411/913 X |
| 3,515,365 | 6/1970 | Jones et al. | 24/662 X |
| 3,717,066 | 2/1973 | Maurer | 411/508 |
| 3,783,477 | 1/1974 | Hamilton et al. | 411/512 X |
| 4,214,505 | 7/1980 | Aimar | 411/510 |
| 4,420,859 | 12/1983 | Hammerle | 24/697 X |
| 4,454,699 | 6/1984 | Strobl | 411/510 X |
| 4,472,918 | 9/1984 | Mach | 24/618 X |
| 4,568,215 | 2/1986 | Nelson | 24/682 X |
| 4,624,585 | 11/1986 | Nix et al. | 411/512 X |
| 4,703,775 | 11/1987 | Pastrone | 411/512 X |

*Primary Examiner*—Neill R. Wilson
*Assistant Examiner*—Jerry Reedman
*Attorney, Agent, or Firm*—William A. Schuetz

[57] ABSTRACT

A fastening element for connecting a component to an apertured panel. The fastening element has a shank with a rounded end for latching engagement with a female latch member. This female latch member is rigidly connected with the component to be fastened or formed integrally therewith. The shank is adapted for limited pivotal movement in the female latch member. During removal of the component, the spherical member is caused to disengage from the female latch member prior to the shank disengaging.

6 Claims, 2 Drawing Sheets

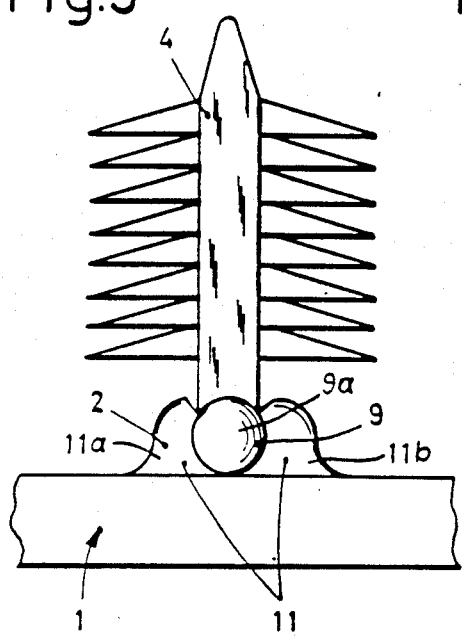
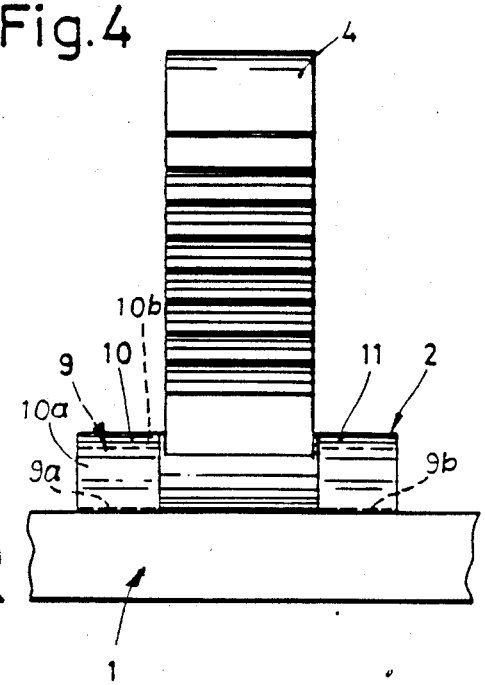
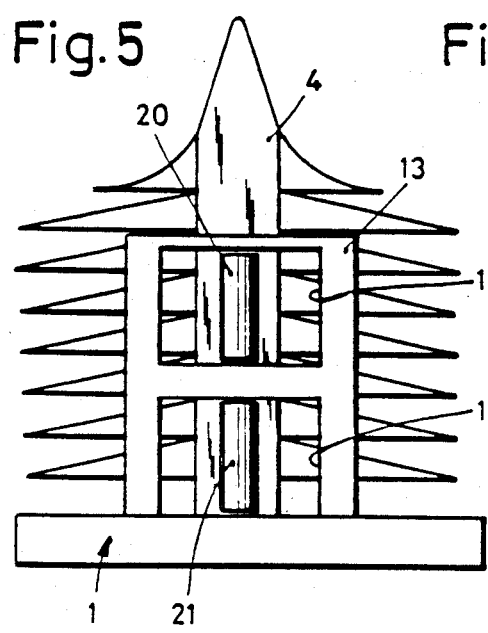
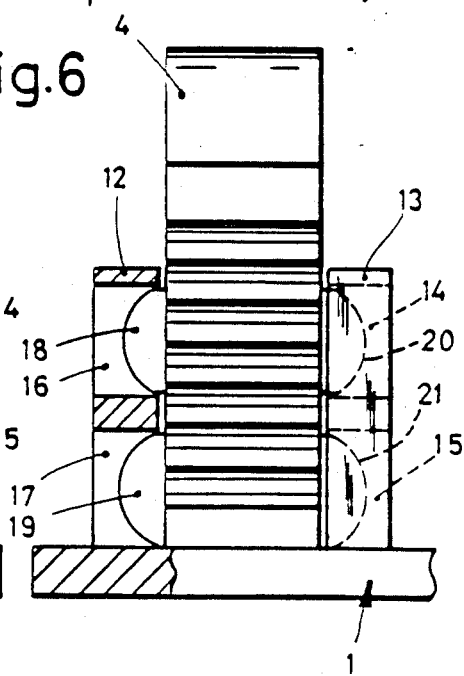

FASTENING ELEMENT

The invention relates to a fastening element with a head for connection to the component to be fastened and a shank for insertion into a fastening aperture and locking engagement therewith. A fastening element of this type has been disclosed in German DE-PS No. 24 06 231.

Fastening elements of this type are used for attaching a door panel to the sheet metal of a motor vehicle door. The usual procedure is to first insert the head of each fastening element into the component to be fastened and to then slide that component onto the component to be covered, so that the shanks of the fastening elements come to be seated in respective fastening apertures. The disadvantage of this prior art fastening element is that in the event the component fastened therewith needs to be removed, it is often subjected to damage, because exerting a pull on that component usually will not enable the shanks to be removed out of the apertures, but will instead cause the heads of the fastening element to be torn out of the component to be removed.

It is the object of the present invention to provide a fastening element of the type described above that enables removal of the fastened component without causing the same to be damaged.

This object is achieved in accordance with the invention in that the shank and the head are separate members and are coupled to one another by a force-locking latching device.

This two-piece arrangement will enable the head of the fastening element to separate from the shank when a pulling force is exerted on the component which is fastened by the fastening elements according to the invention, and will thereby eliminate the heads of the fastening elements to be torn out of the fastened component and to cause damage to the same. After removal of the component, the shanks can easily be pulled out of the fastening openings with a pair of pliers.

One particular advantageous feature of the invention is that the shank is movably retained in the latching device. This arrangement will enable to compensate for dimensional deviations between the positions of the fastening elements or for errors in alignment.

The latching device may be inserted in the usual manner into the component to be fastened. However, in accordance with a more economical and cost-saving arrangement, the latching device is comprised of a latch female member which is integrally formed onto the component to be fastened and a latch male member provided on the shank.

Especially in the case of fastening elements with round shafts used for insertion into round fastening openings, it is advantageously proposed that the latch male member be a spherical member and the latch female member a complementary socket member. A latching device of this design will enable universal movement of the shank. This is particularly advantageous if the component to be fastened is not in exact parallel alignment with the fastening surface provided with the fastening apertures.

For installing the component to be fastened, the shaft may be force-lockingly retained in a non-pivoted mid-position if the spherical member is provided on its peripheral wall with a rounded cam and the retaining member with a corresponding notch.

If the shank of the fastening element has a square cross section and the fastening apertures have a corresponding square cross section, it is sufficient that, in accordance with a further feature of the invention, the latch male member include a bolt which is oriented transversely of the principal direction in which the shank extends, and the latch female member be provided with a clamp for overlapping engagement with this bolt. In the case of square shanks, the invention further proposes that the latch female member be comprised of a pair of webs, with each of the webs being disposed on respective opposite sides of the shank and each web having two square window-like openings, one disposed above the other, into which rounded projections provided on the shaft engage. This will enable the shanks to be displaced transversely with respect to the square fastening openings.

It should be appreciated that a variety of arrangements may be utilized in the practice of the invention. To convey the concept of the invention, three exemplary embodiments are illustrated in the drawings and described in the following specifications.

In the drawings:

FIG. 3 is a view corresponding to that of FIG. 1 of a component with a second exemplary embodiment of the fastening element;

FIG. 4 is a side elevation of the fastening element showing in FIG. 3;

FIG. 5 is a view corresponding to that of FIG. 1 of a component with a third exemplary embodiment of a fastening element; and, FIG. 6 is a side elevation, with part shown in section, of the fastening element shown in FIG. 5.

FIG. 1 shows a fastening element or means 1a for attaching a component 1 to an apertured panel (not shown).

Figure 1:
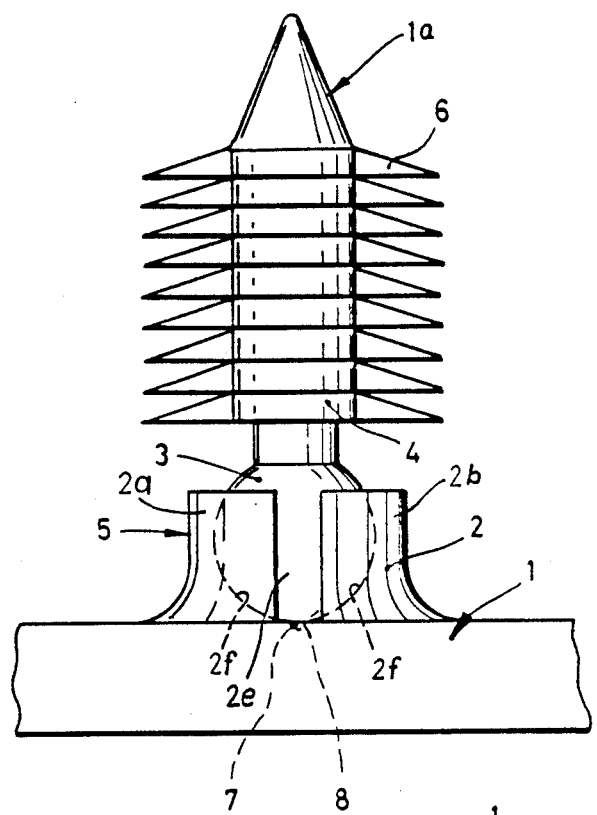
FIG. 1 is a partial view of a component to be fastened by the fastening element according to the invention.

FIG. 1 is a partial view of the component 1 having a latch means or head 2 to be put into latching engagement with the fastening element or component 1a. The head 2 of the component 1 is a female latch means wherein a spherical head 3 of a shank 4 of the other component 1a is retained in latching engagement. The spherical member 3 and the female latch means 2 form a latching device 5 which is designed to enable limited universal movement of the shaft 4. The shaft 4 is provided with a retaining means in the form of outwardly or radially directed saw tooth-like ribs 6 that enable it to be retained in a fastening aperture in a panel (not illustrated in the drawing) when pushed therethrough, the ribs 6 deflecting to lock behind the panel adjacent the aperture.

The spherical member 3 is provided on its peripheral surface with a rounded cam 7 which is aligned with the longitudinal axis of the shank 4. The cam 7 is adapted for engagement with a notch 8 of component 1 so that the shaft 4 is normally retained in its position perpendicular to the component 1.

If, during installation of the component 1, the respective fastening aperture is not in alignment with the shank 4, or if the component 1 is positioned at an angle with respect to the surface to which it is to be fastened, the shank 4 can compensate for these deviations in that the cam 7 is disengaged from the notch 8 to enable pivoting movement of the shank in the socket member 2. If the component 1 is to be removed, the ball 3 can be pulled out of the socket member 2 by exerting a pulling force on the component 1. This will prevent the component 1 to be subjected to damage.

Figure 2:
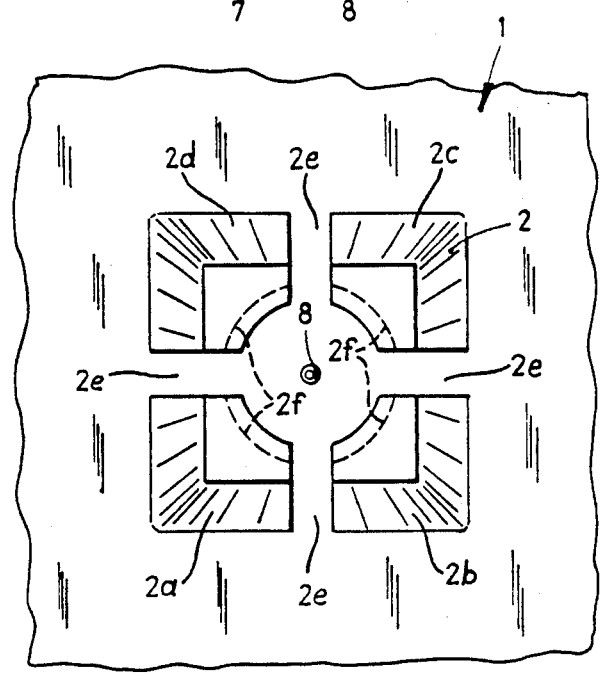
FIG. 2 is a plan view of the portion of the component illustrated in FIG. 1 with a latch female member for the shaft of the fastening element according to the invention.

FIG. 2 illustrates the socket member 2 formed onto the component 1 in greater detail. One will also note in FIG. 2 notch 8 into which the cam 7 of the ball 3 engages so as to be aligned in its midposition. As clearly shown in FIG. 2, the female latch means or socket 2 comprises four latch members or parts 2a, 2b, 2c and 2d. The parts 2a, 2b, 2c and 2d are integral with the component 1, but separated from each other by axially extending slots 2e. The parts 2a, 2b, 2c and 2d of the socket have inner surfaces 2f which are shaped complementary with the ball 3. The parts 2a, 2b, 2c and 2d are sufficiently flexible to enable the ball 3 to be force fittingly connected to the socket member 2 by pushing the ball 3 into the socket member 2.

In the exemplary embodiment according to FIGS. 3 and 4, the shank 4 has a square cross section. At its end adjacent the component 1 the shaft 4 has a transverse bolt 9 whose opposite cylindrically shaped projecting ends or end portions 9a, 9b serve as latch male means. The latch female member is comprised of a pair of upwardly extending clamps 10, 11 which accommodate the bolt 9 for latching engagement. The clamps 10 and 11 each comprise a pair of spaced upwardly extending spaced ears 10a, 10b and 11a, 11b whose inner surface is complementary with the rounded ends 9a, 9b of the bolt 9. The shank 4 is connected to the clamps 10, 11 by force fitting the ends of the bolt 9 between the ears 10a, 10b and 11a, 11b of the clamps 10, 11.

FIGS. 5 and 6 illustrate an exemplary embodiment wherein the latch female means or member is formed by a pair of spaced webs 12, 13, with each web 12, 13 having two window-like openings 14, 15 and 16, 17 respectively. The webs 12 and 13 extend upwardly from the base of the component 1. The shank 4, which again has a square cross section, is provided with rounded projections or portions 18, 19, 20, 21 at its opposite sides which are adapted to be received into the windows 14, 15, 16, 17, respectively. For this purpose, the projections 18-21 are arranged in pairs, one above the other, on respective opposite surfaces of the shaft 4. This will permit linear displacement of the shaft 4 to the right or left, as viewed in FIG. 5, depending on the width of the window-like openings 14-17 so that the projections can be received therein. If one exerts a pulling force on the component 1, the projections 18-21 will, with the shank 4 being retained in position, snap out of the window-like openings 14-17 due to deflection of the webs 12, 13 so that the shank 4 can be disengaged from the webs 12, 13.

The embodiments of the invention in which an exclusive property or privilege is claimed are defined as follows:

1. A fastener means for connecting a component to an apertured panel,
    said fastener means comprising a latch means connected to the component and a separate shank provided with outwardly extending ribs for insertion through the aperture in the panel and latching engagement therewith and provided with connection means for connecting the shank to the latch means, the improvement being that said latch means comprises a plurality of spaced flexible female latch members connected to the component and which together define an opening and that said connection means on said shank includes integrally formed rounded portions extending transversely of said shank, said shank being force fittingly connected to said latch means by aligning said rounded portions with the opening in said latch means and then axially moving said shank to force the rounded transversely extending portions past the flexible latch members until said portions are seated, said latch members being configured such that transverse movement of said shank relative to said latch means is permitted, said rounded portions of said shank being disengageable from said female latch means prior to disengagement of said shank from said panel when a pulling force is exerted on said component connected to said female latch means.

2. A fastening element, as defined in claim 1, and wherein said rounded portions on said shank define a spherically shaped head and wherein said female latch members together define is a socket whose inner surfaces are shaped complementary with said spherical head on said shank.

3. A fastening element, as defined in claim 2, and wherein said spherical head on said shank has a rounded cam on its peripheral surface and the female latch means has a corresponding notch to normally position the shank upright with respect to the female latch means.

4. A fastening element, as defined in claim 3, and wherein the female latch members are formed integral with the component.

5. A fastening element, as defined in claim 1, and wherein said rounded portions are transversely extending cylindrically shaped ends at one end of the shank and wherein said female latch members comprise a pair of spaced clamps, each clamp comprising a pair of spaced ears for snap fittingly receiving said cylindrically shaped ends of said shank.

6. A fastening element, as defined in claim 1, and wherein said female latch members comprise a pair of spaced upright webs provided with window-like transverse openings and wherein said shank has rounded projections extending transversely thereof adjacent one end thereof which are received within said window-like openings.

* * * * *